J. PUTNAM.
SCALE MEASURE.

No. 190,447.          Patented May 8, 1877.

UNITED STATES PATENT OFFICE.

JOHN PUTNAM, OF FITCHBURG, MASSACHUSETTS.

IMPROVEMENT IN SCALE-MEASURES.

Specification forming part of Letters Patent No. 190,447, dated May 8, 1877; application filed January 29, 1877.

*To all whom it may concern:*

Be it known that I, JOHN PUTNAM, of Fitchburg, in the county of Worcester and State of Massachusetts, have invented a new and useful Scale for Determining the Pitch of Gear-Wheels, and for Dividing Circles into any Given Number of Equal Parts, of which the following, taken in connection with the accompanying drawings, is a specification:

My invention relates to a scale for the use of engineers, draftsmen, and machinists in the construction of toothed gearing, and is designed to facilitate the laying out or drawing of toothed gear by obviating the necessity of making certain calculations, which, in the absence of such a scale, have to be made for every gear constructed.

A very common way of constructing and rating toothed gearing among practical mechanics is by the number of teeth to every inch of the diameter of the pitch circle of the wheel, as two teeth to the inch, five teeth to the inch, twelve teeth to the inch, twenty teeth to the inch, or twenty-five teeth to the inch, which means that the wheel is to contain two, five, twelve, twenty, or twenty-five times as many teeth as it is inches in diameter.

In order to the proper laying out of a gear-wheel, or a templet by which to shape a cutter, the pitch must be ascertained. This is usually found by calculation, either by dividing the circumference of the wheel by the whole number of teeth to be formed therein, or by dividing the circumference of one inch by the number of teeth to the inch of diameter.

The object of my invention is to furnish to parties engaged in the construction of toothed gearing a simple, convenient, and comparatively inexpensive implement, by the use of which the mental labor will be very much reduced; and it consists of a thin flat rule having parallel edges, made preferably of steel, and having marked thereon a series of short parallel lines, arranged at unequal distances from each other, the spaces between any two contiguous lines being of the exact length of the "pitch" of given wheel, and having placed opposite said space a number or numbers indicating the number of teeth to the inch of diameter of which the indicated space is the "pitch."

Figure 1:
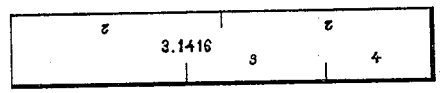
Figure 2:
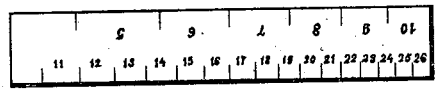

In the drawing, Figure 1 is a view of one side of my improved scale, and Fig. 2 is a view of the opposite side.

The scale shown is made of steel with parallel sides and edges, and is just 3.1416 inches in length, as indicated by the figures 3.1416 on the side shown in Fig. 1, or just equal to the circumference of a circle one inch in diameter.

It will be observed that the upper edge of the scale, as seen in Fig. 1, is divided into two equal spaces, each of which is marked 2, which means that the distance from the end of the scale to the line in the center of its length is the "pitch" for a gear having two teeth to the inch of the diameter. The lower edge of same side of the scale has two marks at right angles to its edge, the space between the right-hand end of the scale and the first mark being marked 4, and the space between the two lines being marked 3, thus indicating that the two spaces thus marked are the "pitches," respectively, of gear-wheel having four and three teeth to the inch of diameter.

In Fig. 2, upon the upper edge of the scale, are indicated in a similar manner the "pitches" for five, six, six, seven, eight, nine, and ten teeth to the inch of the diameter, and on the lower edge are divisions and numbers representing the several pitches of wheels having eleven to twenty-six teeth to the inch of the diameter.

The spaces not numbered are not to be used.

If it is desired to lay out a gear-wheel having four teeth to the inch of the diameter, instead of stopping to figure out the "pitch" all the draftsman or mechanic has to do is to take the space marked 4 in his dividers, or, in other words, set his dividers by the scale a distance apart equal to the length of the space marked 4, and transfer it to his paper or templet.

If the gear to be constructed is to have but one tooth to the inch, the "pitch" is equal to the whole length of the scale, and if only one tooth to two inches of the diameter, then the pitch will be equal to just twice the whole length of the pitch. If, however, a finer pitch is desired than those herein described, the spaces may be subdivided, or otherwise reduced in their divisions, or divisions representing finer pitches may be marked on the spaces not now numbered, and one of the divisions marked 2.

If the wheel is to have twenty-six teeth to the inch, then the smallest division on the scale marked 26 is the pitch.

The scale may be made longer, if desired, and the figures and marks may all be placed upon one side thereof; or this scale may be combined with the ordinary machinists' or draftsmen's scales.

What I claim as new, and desire to secure by Letters Patent of the United States, is—

A rule or scale having marked thereon a series of divisions of unequal length, each of which is the measure of the "pitch" of a gear-wheel having a given number of teeth to the inch of the diameter, and also having stamped or otherwise marked thereon a series of numbers, each of which represents the number of teeth to the inch of the diameter, of which the division opposite to or in which it is placed is the pitch.

Executed at Fitchburg, Massachusetts, this 20th day of January, A. D. 1877.

JOHN PUTNAM.

Witnesses:
  SILAS HOLMAN,
  GEO. E. PUTNAM.